T. E. MURRAY.
PROTECTIVE CASING FOR LINE CONDUCTORS.
APPLICATION FILED NOV. 8, 1912.
1,103,984.  Patented July 21, 1914.
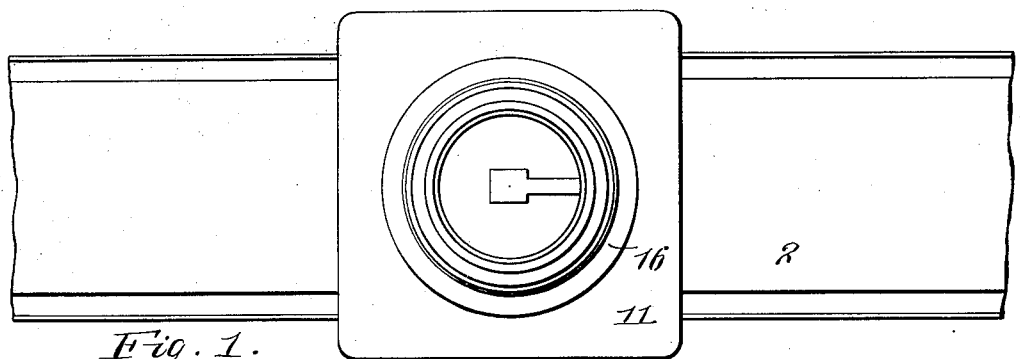
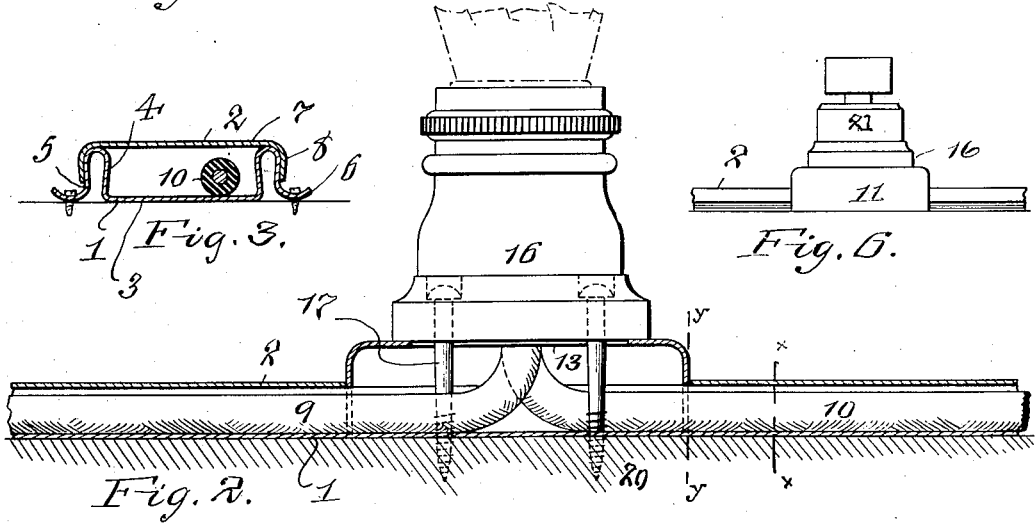
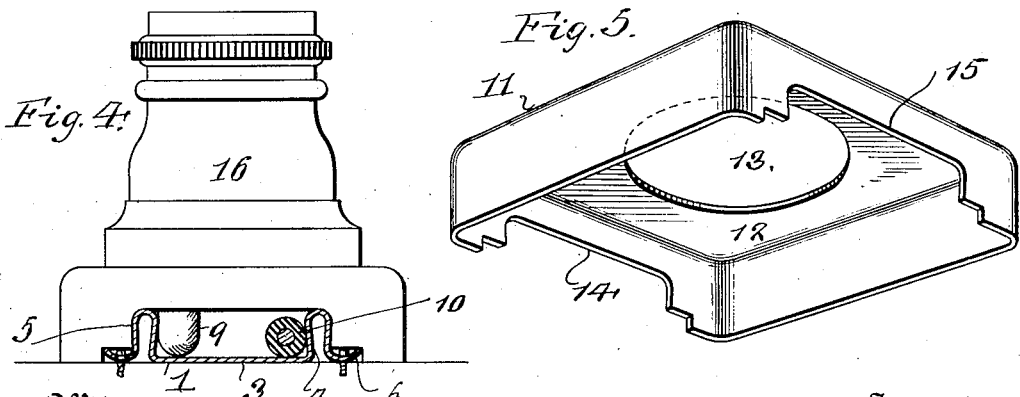

UNITED STATES PATENT OFFICE.

THOMAS E. MURRAY, OF NEW YORK, N. Y.

PROTECTIVE CASING FOR LINE CONDUCTORS.

1,103,984. Specification of Letters Patent. Patented July 21, 1914.

Application filed November 8, 1912. Serial No. 730,131.

*To all whom it may concern:*

Be it known that I, THOMAS E. MURRAY, a citizen of the United States, residing at New York, in the county of New York and State of New York, have invented a certain new and useful Improvement in Protective Casings for Line Conductors, of which the following is a specification.

In my co-pending application Serial No. 698,398, filed May 20, 1912, I have described a tubular sheet metal protective casing for line conductors, formed in two sections, each section having a bottom and side flanges, and one section being inverted and placed upon the other section, so that the side flanges of the outer section make contact with and cover the side flanges of the inner section. In this way the outer section is caused to inclose and protect the inner section in which the line conductors are disposed. In using this casing it is of advantage to be able to establish an outlet at any point along its length, and to provide for the attachment thereto of a lamp, switch or other appliance. The present invention provides a simple way of doing this, by means easily applied or removed without in any wise impairing the casing, and which occupies but little space and forms no unsightly protuberance from the wall or ceiling along which the protective casing may extend.

In the accompanying drawings—Figure 1 is a top view of my device. Fig. 2 is a longitudinal section. Fig. 3 is a transverse section on the line $x$, $x$ of Fig. 2. Fig. 4 is a transverse section on the line $y$, $y$, of Fig. 3. Fig. 5 is a perspective view of the outlet box. Fig. 6 is a side elevation of the device, showing a switch substituted for the lamp and socket shown in Fig. 2.

Similar numbers of reference indicate like parts.

As described in my aforesaid application, the casing is formed of two longitudinally separable trough-shaped portions, having resiliently engaging side flanges, namely, a base section 1 and a cover section 2. The base section has a flat bottom 3 and side flanges 4 which are bent over outwardly, as shown at 5, to form double walls, and then outwardly again, as shown at 6, to form gutters. The base section is secured to the wall or other support by nails or screws passing through said gutters. The cover section 2, which also has a flat bottom 7 and side flanges 8, is inverted and placed upon base section 1, so that the side flanges 8 cover the outer faces of side flanges 4. The conductors 9, 10 are led through the tubular conduit thus formed.

In order to make an outlet at any desired point on the casing, I remove a portion of the cover section, or separate the ends of two abutting sections, so as to leave the base section exposed. I then place over the interval thus formed an inverted box 11, Fig. 5. Two opposite flanges of said box have their lower edges cut out, as shown at 14, 15, so as to fit upon the base section 1, as shown in Fig. 2, the resiliency of said base section flanges causing an engagement between said base section flanges and said box flanges, whereby said box is firmly held in place. Preferably in the bottom wall 12 of the box 11 is a circular opening 13 which is covered by a socket 16, secured in place by screws 17 which pass through opening 13 and the bottom of the base section and enter the supporting wall 20.

The terminals of the conductors 9, 10 are carried through the opening 13 and are secured to the socket terminals in the usual way.

Instead of connecting a lamp socket to my device, I may connect in like manner a rotary switch 21, Fig. 6, of any suitable construction.

I claim:

1. A casing for line conductors, comprising a support, a trough-shaped sheet metal base section on said support, an inverted box-shaped sheet metal cover for said section having a top wall and side walls, the said cover having in the edges of its opposite transverse side walls recesses fitting upon said base section and in its top wall an opening, a plate covering said opening, and means extending through said plate for securing said cover and said plate to said support.

2. A casing for line conductors, comprising a support, a trough-shaped sheet metal base section on said support, an inverted box-shaped sheet metal cover for said section, the said cover having a top wall and side walls and having in the edges of its opposite transverse side walls recesses extending transversely across and fitting upon said base section and having the edges of its longitudinal side walls and the unrecessed portions of the edges of its transverse side walls in contact with said support and in said top wall an opening, a plate covering said opening, and means extending through said plate for securing said cover and said plate to said support.

3. A casing for line conductors, comprising a support, a trough-shaped sheet metal base section on said support, an inverted box-shaped sheet metal cover for said section, the said cover having a top wall and side walls and an opening in its top wall and oppositely disposed recesses in the edges of its side walls, the said recesses extending transversely across and fitting upon said base section, a socket covering said opening, and means extending through said opening for clamping together said socket, said cover and said base section and securing the same to said support.

In testimony whereof I have affixed my signature in presence of two witnesses.

THOMAS E. MURRAY.

Witnesses:
 GERTRUDE T. PORTER,
 MAY T. MCGARRY.